(12) United States Patent
Wack et al.

(10) Patent No.: US 7,817,800 B2
(45) Date of Patent: Oct. 19, 2010

(54) CRYPTOGRAPHIC KEY SPLIT BINDER FOR USE WITH TAGGED DATA ELEMENTS

(75) Inventors: C. Jay Wack, Clarksburg, MD (US); Edward M. Scheidt, McLean, VA (US); James L. Kolouch, Vienna, VA (US)

(73) Assignee: TecSec, Inc., McLean, VA (US)

( * ) Notice: Subject to any disclaimer, the term of this patent is extended or adjusted under 35 U.S.C. 154(b) by 1154 days.

(21) Appl. No.: 11/473,520

(22) Filed: Jun. 22, 2006

(65) Prior Publication Data

US 2007/0014400 A1    Jan. 18, 2007

Related U.S. Application Data

(60) Division of application No. 09/992,529, filed on Nov. 20, 2001, now Pat. No. 7,095,852, which is a continuation-in-part of application No. 09/023,672, filed on Feb. 13, 1998, now Pat. No. 6,885,747.

(60) Provisional application No. 60/249,451, filed on Nov. 20, 2000.

(51) Int. Cl.
*H04L 9/00* (2006.01)
*H04N 7/167* (2006.01)

(52) U.S. Cl. .................... 380/44; 380/277; 380/200

(58) Field of Classification Search ............ 380/11, 380/277, 44, 200
See application file for complete search history.

(56) References Cited

OTHER PUBLICATIONS

XML in an adaptive framework for instrument control; Ames, T.J. ; Adv. Archit. & Autom. Branch, NASA Goddard Space Flight Center, Greenbelt, MD, USA ; Aerospace Conference, 2004. Proceedings. 2004 IEEE; Issue Date : Mar. 6-13, 2004 vol. 5-3336 vol. 5 ; pp. 1-11.*
Andreadis, A.; Baldo, D.; Benelli, G.; Daino, G.L.; Software, Telecommunications and Computer Networks, 2007. SoftCOM 2007. 15th International Conference on Publication Year: 2007 , pp. 1-4.*
Study of Digital Signature with Encryption Based on Combined Symmetric Key; Wu Suyan; Li Wenbo; Hu Xiangyi; E-Business and Information System Security, 2009. EBISS '09. International Conference on Publication Year: 2009 , pp. 1-4.*

* cited by examiner

*Primary Examiner*—David Y Jung
(74) *Attorney, Agent, or Firm*—IP Strategies

(57) ABSTRACT

A cryptographic key split binder includes key split generators that generate cryptographic key splits from seed data and a key split randomizer for randomizing cryptographic key splits to produce a cryptographic key, and a process for forming cryptographic keys. Key split generators can include a random split generator for generating a random key split based on reference data, a token split generator for generating a token key split based on label data, a console split generator for generating a console key split based on maintenance data or a biometric split generator for generating a biometric key split based on biometric data. Any key split can further be based on static data, which can be updated. Label data can be read from a storage medium, and can include user authorization data. A cryptographic key can be, for example, a stream of symbols, at least one symbol block, or a key matrix.

20 Claims, 4 Drawing Sheets

```
<?xml version="1.0" encoding="IS08859-1" ?>
- <CUSTOMERLIST>
- <CUSTOMER >
  <NAME>Glenn Gossage</NAME>
  <EMAIL>Gossage@somedomain.com</EMAIL>
  <HOMEPHONE>7031234567</HOMEPHONE>
   </Customer>
- <Customer>
  <NAME>John Doe</NAME>
  <EMAIL>JDoe@somedomain.com< /EMAIL>
  <HOMEPHONE>4151234567</HOMEPHONE>
   </CUSTOMER>
   </CUSTOMERLIST>
```

```
<?xml version="1.0" encoding="ISO8859-1" ?>
- <CUSTOMERLIST>
- <CUSTOMER >
  <NAME>Glenn Gossage</NAME>
  <EMAIL>Gossage@somedomain.com</EMAIL>
  <HOMEPHONE>7031234567</HOMEPHONE>
  </Customer>
- <Customer>
  <NAME>John Doe</NAME>
  <EMAIL>JDoe@somedomain.com< /EMAIL>
  <HOMEPHONE>4151234567</HOMEPHONE>
  </CUSTOMER>
  </CUSTOMERLIST>
```

FIG. 3

| TAG | LEVEL/LABEL |
|---|---|
| NAME | 1 |
| EMAIL | 1 |
| HOMEPHONE | 2 |

FIG. 4

CRYPTOGRAPHIC KEY SPLIT BINDER FOR USE WITH TAGGED DATA ELEMENTS

CROSS-REFERENCE TO RELATED DOCUMENTS

This is a divisional of U.S. patent application Ser. No. 09/992,529, which was filed on Nov. 20, 2001, now U.S. Pat. No. 7,095,852 which in turn was a continuation-in-part of U.S. patent application Ser. No. 09/023,672, filed on Feb. 13, 1998 now U.S. Pat. No. 6,885,747 and which was related to U.S. Provisional Patent Application Ser. No. 60/249,451, filed on Nov. 20, 2000.

FIELD OF THE INVENTION

The present invention relates to cryptographic systems. In particular, the present invention relates to a system for formulating cryptographic keys used to encrypt plaintext messages and decrypt ciphertext communications.

BACKGROUND OF THE INVENTION

In the modern world, communications are passed among parties in a variety of different ways, utilizing many different communications media. Electronic communication is becoming increasingly popular as an efficient manner of transferring information, and electronic mail in particular is proliferating due to the immediacy of the medium.

Unfortunately, drawbacks accompany the benefits provided by electronic communication, particularly in the area of privacy. Electronic communications might be intercepted by unintended and unauthorized recipients. Wireless transmissions, such as voice communication by cellular telephone, and electronic mail, are especially susceptible to such interception.

The problem of electronic communication privacy has been addressed, and solutions to the problem have been put in place. One form of solution uses cryptography to provide privacy for electronic communication. Cryptography involves the encrypting or encoding of a transmitted or stored message, followed by the decryption or decoding of a received or retrieved message. The message usually takes the form of a digital signal, or a digitized analog signal. If the communication is intercepted during transmission or is extracted from storage by an unauthorized entity, the message is worthless to the interloper, who does not possess the means to decrypt the encrypted message.

In a system utilizing cryptography, the encrypting side of the communication incorporates an encoding device or encrypting engine. The encoding device accepts the plaintext (unencrypted) message and a cryptographic key, and encrypts the plaintext message with the key according to an encrypt relation that is predetermined for the plaintext communication and the key. That is, the message is manipulated with the key in a predetermined manner set forth by the text/key relation to produce a ciphertext (encrypted) message.

Likewise, the decrypting side of the communication incorporates a decoding device or decrypting engine. The decoding device accepts the ciphertext message and a cryptographic key, and decrypts the ciphertext message with the key according to a decrypt relation that is predetermined for the ciphertext message and the key. That is, the message is manipulated with the key in a predetermined manner set forth by the text/key relation to produce a new plaintext message that corresponds with the original plaintext message.

The manner in which the key and the relation are applied in the communication process, and the manner in which keys are managed, define a cryptographic scheme. There are many conventional cryptographic schemes in use today. For example, probably the most popular of these is a public-key cryptographic scheme. According to a scheme of this type, the keys used are actually combinations of a public key component that is available to anyone or to a large group of entities, and a private key component that is specific to the particular communication.

An important consideration in determining whether a particular cryptographic scheme is adequate for the application is the degree of difficulty necessary to defeat the cryptography, that is, the amount of effort required for an unauthorized person to decrypt the encrypted message. One way to improve the security of the cryptographic scheme is to minimize the likelihood that a valid key can be stolen, calculated, or discovered. The more difficult it is for an unauthorized person to obtain a valid key, the more secure communications will be under a particular scheme.

Typically there are two types of data exchange when dealing with business-to-business ("B2B") e-commerce. One type involves a data stream being sent from one company to another, performed effectively in real time. The other type deals with files being transferred from one company to another, either singularly or in a batch. This latter type is where encryption might be especially important, since these files can be transferred using a non-secure protocol, such as FTP for example. Additionally, these files can be located outside of a company's firewall(s), and might only be protected from unauthorized access via a user name and password. Thus, encrypting stored files or files in transit will protect against disclosure of the information within the file to an unauthorized entity that has acquired possession of the file. However, this scheme will not work if authorized entities cannot reasonably access files to which they have authorization. They must still possess an appropriate key, and secure transportation of the cryptographic key can be problematic.

Use of a cryptographic key split combiner, such as that described in U.S. patent application Ser. No. 09/023,672, filed on Feb. 13, 1998, the entirety of which is incorporated herein by reference, provides a solution to the key transportation problem. Utilizing this combiner, a working key, or cryptographic session key, is generated by combining cryptographic key splits. This working key is then used to cryptographically secure a subject data element. Accordingly, decryption under this system requires possession of, or means to produce, the requisite key splits by which the working key can be formed.

For example, U.S. Pat. No. 5,369,702 to Shanton (and its progeny: U.S. Pat. Nos. 5,680,452; 5,717,755; and 5,898,781) describes a method for providing multi-level multimedia security in a data network. According to this method, an object-oriented key manager is accessed to begin the encryption process. From the view-point of data files, the "object" that is the subject of the encryption process can be a single file. It can also be a group of files, or a portion of a file. For example, the object can be a single document created using a word processing application, a group of such documents stored in a directory, or a paragraph within a document. The object can be a single Web page, or a series of linked pages, or a particular image file present on a Web page. The object can be a single e-mail message, an entire thread of e-mail messages, or a sentence, or header information, within the e-mail message. As explained in the Shanton patent, and as used herein, an object can be any data instance, whether a complete file, a group of files, or a portion of a file. Different portions of a file (overlapping or non-overlaping) can be separate objects within that file, which can itself be a separately identified object.

According to the system described in the Shanton patent, once an object is selected for encryption, a label is selected for the object, as well as a text/key relation for the encryption session. The object is then encrypted according to the text/key relation, and labeled according to the selected label. Labeled, encrypted objects can be embedded within other objects, in which case the container object can be encrypted or plaintext. To decrypt, the label is read, and access authorization is determined according to the label. The encrypted object can then be decrypted if the label indicates that access authorization is granted. Encrypted objects embedded within container objects are similarly decrypted.

Thus, objects can be encrypted with a specific granularity, and broadcast to a large group of recipients, with confidence that selected objects will only be accessed by designated recipients. For example, a simple text document created using a word processor can include several sections, each intended to be read by a different group within an organization. Each section can be identified as a separate object, and encrypted using a label that restricts decryption of that section to an identified group. Sections can overlap, in cases where more than one group is intended to have access to the same material within sections of the document. That document, with the encrypted object sections, can be broadcast to everyone within the organization, and only those persons having roles within the organization identified by the labels can access the plaintext versions of those sections. If the document has sections of general interest to everyone in the organization which are not restricted for access, the overall document can be transmitted or stored unencrypted, with only appropriate sections encrypted as described. If security considerations dictate that everything in the document should be restricted such that it can be accessed only by members of the organization, the document can be identified as a container object that is itself encrypted and labeled such that the document itself cannot be access by those outside the organization. Each person within the organization would be able to "unwrap" the overall document, but would only be able to access those sections to which he or she has access as determined by the labels on the objects within.

The Shanton system disclosed applicability of this cryptographic system to objects of all media types. Thus, the system can be applied to, for example text files, sound files, image files, and objects that are combinations of one or more of these media types. However, the Shanton patent only contemplated an object that was created in an application, to which the decrypted object is returned. The system was not disclosed as applicable to an object created as an XML file that need not be returned to a creating application, and that would have "tags" identifying portions of the document by type.

Shanton described the use of labels, but did not specify the nature of the label, or how the label should be applied. Co-pending U.S. patent application Ser. No. 09/023,672, filed on Feb. 13, 1998, the disclosure of which is incorporated herein by reference in its entirety, describes a system for formulating cryptographic keys from various respective sources of seed data. The seed data are provided to respective key split generators, which generate key splits, or components, based on the seed data. The key splits are then randomized together to form the cryptographic key used to encrypt the subject data. The seed data used to form the key splits can come from any of a number of sources. One of those sources can be label data, so that a label split is generated as a component of the cryptographic key, such that the key carries with it a label component. The label seed data can be provided in any of a number of ways. For example, the seed can be something as simple as an alphanumeric code keyed in by a user, where the code is a password or some other identifier of the user or the intended recipient that relates to labels used by the system. Alternatively, the label seed can be provided on a physical mechanism, such as a token, which can be read by the system to provide the required label data.

Thus, an object can be selected for encryption using the completed key, which can include label information imparted by the key split. The object (for example, a text file, Web page, multi-media file) is encrypted using the key to restrict access to those with keys formed using proper splits. If portions of a document are separate objects, each object is encrypted individually, then the document can be wrapped (or not) for broadcast to an entire recipient list.

The use of encryption for Web site content is important, because it is well known that Web sites on the Internet, and other files accessible by request to a server on a network, risk unauthorized access (for example, by hacking). If adequate precautions are not taken, server-accessible content (for example, Web pages and the like) can be replaced by a hacker, with embarrassing results. Further, sensitive data, such as price lists, salary information, and other information of a private nature, can be obtained and adversely used or disseminated to competitors, news media, or the general public. Encryption can provide a solution to both problems. By encrypting served content, the encrypted served context is unreadable to one without cryptographic authorization. Further, the encrypted served content cannot otherwise be readily modifiable or replaceable, because a Web server providing encrypted content could ensure that the content is encrypted before it is sent to a requesting recipient. In fact, recognition that a page had been altered or replaced would be a relatively uncomplicated matter for the Web server, using such known mechanisms as digital seeds and checksums. If modification is the only concern, use of digital seeds such as signatures can also provide a solution to this problem. If both content and modification are important, then encryption of the served content would be appropriate. A solution incorporating a cryptographic key split combiner such as that described above can provide multiple Web servers with keys for encryption of sensitive content, while allowing for authorized entities to decrypt appropriate files or other content at any time.

Various organizations have addressed the subject of cryptography in general, and also as particularly applied to specific forms of communication or data at rest. For example, a draft standard has been submitted to ANSI, X9.73-1 99x: Cryptographic Message Syntax, which specifies a cryptographic message syntax ("CMS") that can be used to protect financial transactions and other documents from unauthorized disclosure and modification. This syntax is described fully in a working draft, which is herein incorporated by reference in its entirety.

Further complicating the situation is the proliferation of computer languages, such as the Extensible Markup Language ("XML"), that store data as plaintext, which is readily accessible by any party having access to a stored file, and not just to someone having and running a particular software application. A benefit to using this language to create documents is that storage of data as plaintext allows programmers to more easily debug applications, and in emergencies, to correct corrupted or invalid data (for example, fix a "broken" XML file) with a simple text editor. However, this flexibility also creates new opportunities for unauthorized access to and use of the data in the file.

XML, and other languages having its capabilities, is especially problematic due to its highly descriptive nature. XML is a markup language that is designed to allow an XML designer to describe stored data via custom-defined tags. An XML instance generally includes one or more data elements. XML can also provide a number of element types, such as, for example, root elements, child elements, element attributes, comments, plural elements, etc. Thus, each data element is provided with at least one respective tag that specifically describes the particular data element or group of elements. For example, a data element can be "12341234123412341234123003", and its respective tag can be "<credit card data>." When stored as plaintext, the data element alone might not be readily identifiable or usable by an unauthorized party. However, when viewed with its descriptive tag, the data element's defined nature is known, and the risk of an undesirable disclosure or use is significantly increased compared with that of untagged data elements.

There are different views as to how encryption processes should be implemented, both in general and with regard to XML. For example, see "Specification of Element-wise XML Encryption," Takeshi Imamura and Hiroshi Maruyama, August 2000, IBM Research document, Tokyo Research Laboratory. Also see "XML Encryption Syntax and Processing," Aug. 10, 2000, from the W3C public XML Encryption list; and "Design and Implementation of an Access Control Processor for XML Documents", Ernesto Damiani, Sabrina De Capitani di Vimercati, Stefano Paraboschi, and Pierangela Samarati, Aug. 10, 2000. However, no conventional approach establishes a linkage among objects, labels, and encryption to tagged data elements; or applies role-based or multiple-level object encryption methods, or any encryption scheme involving asymmetrical parameters, to tagged data elements.

BRIEF SUMMARY OF THE INVENTION

It is therefore an object of the present invention to provide a process and apparatus that can be used to create a cryptographic key, which in turn can be used to secure one or more respectively tagged data elements contained in a data instance.

It is another object of the present invention to provide a process of cryptographically securing one or more respectively tagged data elements contained in a data instance.

It is further object of the present invention to provide a process of transporting keying data corresponding to a cryptographic key used to decipher one or more respectively tagged, cryptographically secured, data elements.

According to an exemplary aspect of the present invention, a cryptographic key split combiner creates a cryptographic key to secure one or more respectively tagged data elements. The combiner includes a plurality of key split generators for generating cryptographic key splits based on seed data, and a key split binder for binding the cryptographic key splits together to produce the cryptographic key. At least one of the cryptographic key splits is based on at least one of the one or more respective tags. The key splits are bound together in any consistently repeatable manner (for example, randomly, via concatenation, or via hashing). The cryptographic key can be symmetric or asymmetrical. The one or more respective tags, or a value ("label") referenced or derived from the tag(s), can be used as seed data for any type of key split generator, and can correspond to one or more roles, rules, or privileges regarding the one or more data elements.

According to another exemplary aspect of the invention, the key split generators include a label split generator for generating a label key split based on at least one of the one or more respective tags. A label split generator can be further based on static data and/or maintenance data. Static data can be updated. One manner of updating static data is by modifying a prime number divisor of the static data.

In another exemplary aspect of the invention, the key split generators include a random split generator for generating a random (or pseudorandom) key split based on reference data. The random key split can be further based on chronological data. The random key split can instead be based on reference data and at least one of chronological data, static data, maintenance data, and at least one of the respective one or more tags. Static data can be updated.

Other key split generators can include, for example, a token split generator for generating a token key split based on at least one of the respective one or more tags, organization data, and static data; a console split generator for generating a console key split based on at least one of maintenance data (whether previous or current) and static data; and a biometric split generator for generating a biometric key split based on at least one of biometric data, biometric combiner data, and static data. Biometric data can include biometric data vectors. Label data can be read from a storage medium, through an input device (for example, keyboard entry, communications channel, or a voice recognition application) or generated based on other known data (for example, at least one of the one or more respective tags). Label data can include, for example, user authorization data, rule data, authorization data, condition data, or role data, alone or in any combination. The resulting cryptographic key can be, for example, a stream of symbols, at least one symbol block, or a key matrix.

In a further exemplary aspect of the invention, a process of creating a cryptographic key to secure one or more respectively tagged data elements, includes generating a plurality of cryptographic key splits from seed data, and binding the cryptographic key splits together to produce the cryptographic key. At least one of the cryptographic key splits is based on at least one of the one or more respective tags. The one or more respective tags, or a value referenced or derived from the tag(s), can be used as seed data for any type of key split generator. A tag, or label, can correspond to one or more roles, rules, or privileges regarding the one or more data elements.

The cryptographic key splits can include, for example, one or more of the following: a label key split, a random key split, a pseudorandom key split, a token key split, a console key split, and a biometric key split.

According to another exemplary aspect of the invention, a process of cryptographically securing one or more respectively tagged data elements, includes: generating a plurality of cryptographic key splits from seed data, binding the cryptographic key splits together to produce a cryptographic key, and encrypting the one or more respectively tagged data elements with the cryptographic key. At least one of the cryptographic key splits is based on at least one of the one or more respective tags. The one or more tags, or a value referenced or derived from the tag(s), can be used as seed data for any type of key split generator. A tag, or label, can correspond to one or more roles, rules, or privileges regarding the one or more data elements.

According to another exemplary aspect of the invention, a process of providing keying data corresponding to a cryptographic key used to decipher one or more respectively tagged, cryptographically secured, data elements, includes selecting the keying data, and providing the keying data to an intended recipient. "Providing" the keying data can mean transmitting, transporting, or otherwise sending the keying data to the recipient, or storing the keying data such that it is accessible to the recipient.

According to another aspect of the present invention, keying data includes any data used to create the cryptographic key by a recipient, and can include, for example, one or more key splits, one or more instances of seed data, one or more key or key/text relation identifiers, or any other type of data used to create the cryptographic key (for example, decryption data for decrypting encrypted keying data).

A process of providing keying data can include encrypting the keying data, in whole or in part, before providing the data, and optionally, including as keying data, if necessary, decryption data needed to decrypt the encrypted keying data. "Providing" the keying data can mean transmitting, transporting, or otherwise sending the keying data to the recipient, or storing the keying data such that it is accessible to the recipient.

Further, a process of providing keying data can include formatting the keying data according to a cryptographic message syntax to facilitate interpretation of the keying data and decryption of the one or more secured data elements.

The present invention, as described above, is particularly advantageous when applied to a system having tagged data objects, and utilizing labels and cryptographic binding and enforcement. XML, as a tag-based technology, fits well into this scheme. XML tags, either directly or through a conversion or relationship process, can relate to cryptographic labels, particularly those applied to encrypted objects. XML, with its ability to relate data to different applications, can provide a means to securely move encrypted data among such applications. That is, agreed XML schemas can assist encryption to run transparently and over and between various applications that utilize key management and encryption according to the present invention as described herein.

Thus, while encryption schemes can be used to encrypt any type of data, encryption of XML data objects is of special interest, because XML's ability to capture the structure and semantics of data makes new applications available for cryptographic processes. For example, an XML instance can include a list of a company's customers with their names, e-mail addresses, and credit card information. In an exemplary retail environment, employees in the marketing department are allowed access to customers' names and addresses, and are not allowed access to their credit card information. Thus, a certain level of granularity, through labeling, can be provided such that marketing department personnel can decrypt customer name and address elements, but cannot decrypt credit card elements, when all of those elements are present in the same database.

XML can be construed as a process that uses "tagging" for element manipulation, such that "roles and rules" can be applied to be used by a cryptographic scheme to enforce the confidentiality layer (proportional access control) to those elements. For example, an XML form (as a presentation of fields with names) can be created that can be widely distributed, but narrowly read.

The tags applicable to XML data elements, can be related to labels, or treated as the actual labels, for example, and the elements themselves can be identified as the objects to be secured through cryptography. Also, the tags can be treated as seed data to be provided to a key split generator that generates a label key split, for binding with other key splits to form a cryptographic key. Thus, the XML format itself can be used as part of the cryptographic scheme to determine how the underlying data element is encrypted, and what the rules are for decrypting the encrypted document.

"Access" to a document or other data element can involve more than just the ability to read the data element. "Access" can relate to a specific privilege or set of privileges that also can be defined by the cryptographic scheme. Privileges that can be controlled through the use of the system of the present invention include the following: read, write, create, delete, print, and copy, as well as any other access, manipulation, or modification privilege. In addition to privilege, subject, element, and condition-bases can be included as rules. The system of the present invention, using any naming convention as the human interface, can adapt the front end of any application's structure and add the weight of encryption's enforcement.

BRIEF DESCRIPTION OF THE DRAWINGS

The present invention is described in more detail below, with reference to the following drawings wherein:

FIG. 3 is an exemplary set of XML data elements.

FIG. 4 shows an exemplary tag/label relation.

DETAILED DESCRIPTION OF THE INVENTION

Figure 1:
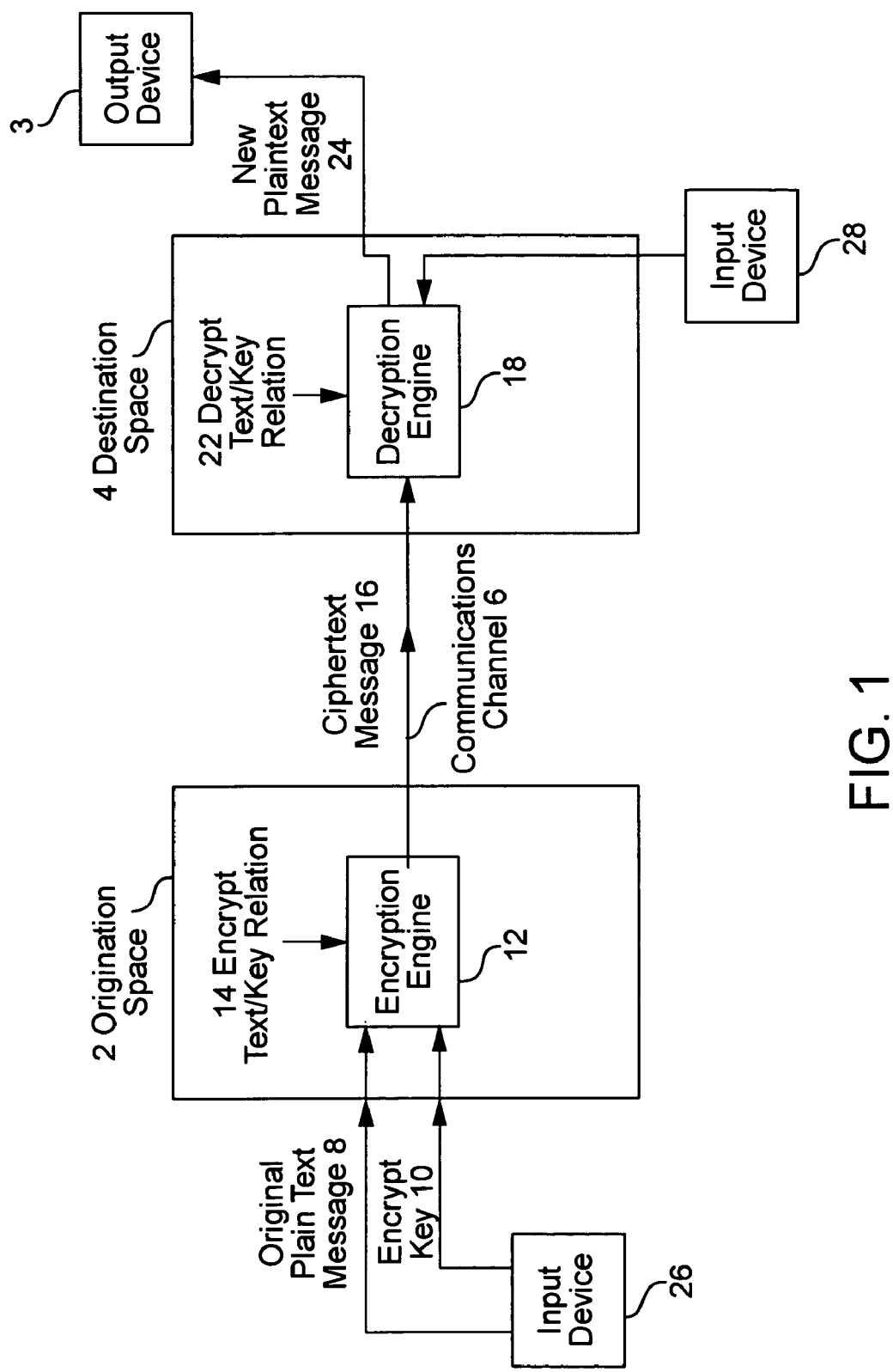
FIG. 1 is a block diagram of a communications environment in which cryptography can be utilized.

Referring to FIG. 1, a communication has an origination space 2 and a destination space 4. The origination space 2 defines the place and time at which the communication originates. The destination space 4 defines the place and time at which the communication is intended to be accessed. The origination space 2 and the destination space 4 can be remote in location. Alternatively, they can be collocated but displaced in time. The space and time correspondence between the origination space 2 and the destination space 4 depends on the nature of a particular communication. The origination space 2 and destination space 4 are coupled to a common communications channel 6.

This communications channel 6 can bridge a physical space, such as empty air in the case of a cellular voice telephone call or wireless network connection. Alternatively, the communications channel 6 can be temporary storage for the communication while time passes between the origination space 2 and the destination space 4, such as a message left in memory on a computer by a first user, for a second user to access at a later time on the same computer. The communications channel 6 can also be a combination of the two, such as telephone cables and storage memory in the case of an electronic mail transmission.

At the origination space 2, the original plaintext message 8 is received and encrypted according to the encrypt text/key relation 14, using a provided encrypt key 10, to create a ciphertext message 16. The ciphertext message 16 is received at the destination space 4 via the communications channel 6. An authorized entity having a proper decrypt key 20 can then provide the decrypt key 20 to the destination space 4, where it is applied to the ciphertext message 16 according to a decrypt text/key relation 22 to create a new plaintext message 24 that corresponds to the original plaintext message 8.

The origination space 2 and the destination space 4 can be, for example, computers, or even the same computer. An exemplary computer can have a certain amount of storage space in the form of memory for storing the text/key relation. A microprocessor or similar controller, along with a control structure and random access memory for storing original plaintext and keys provided by a user, can be included in each space and can perform the functions of the encryption/decryption engine. An input device 26, 28, such as a keyboard, floppy disk drive, CD-ROM drive, or biometrics reader, can also be provided for accepting the key and plaintext message from the origination user, and the key from the destination user. At the destination space 4, an output device 30, such as a monitor, disk drive, or audio speaker, can also be provided to present the new plaintext message to the destination user. The text/key relation can be stored on a floppy disk or other permanent or temporary portable storage, rather than in hard storage in the computer, to allow different text/key relations to be applied by different users or in different situations.

Figure 2:
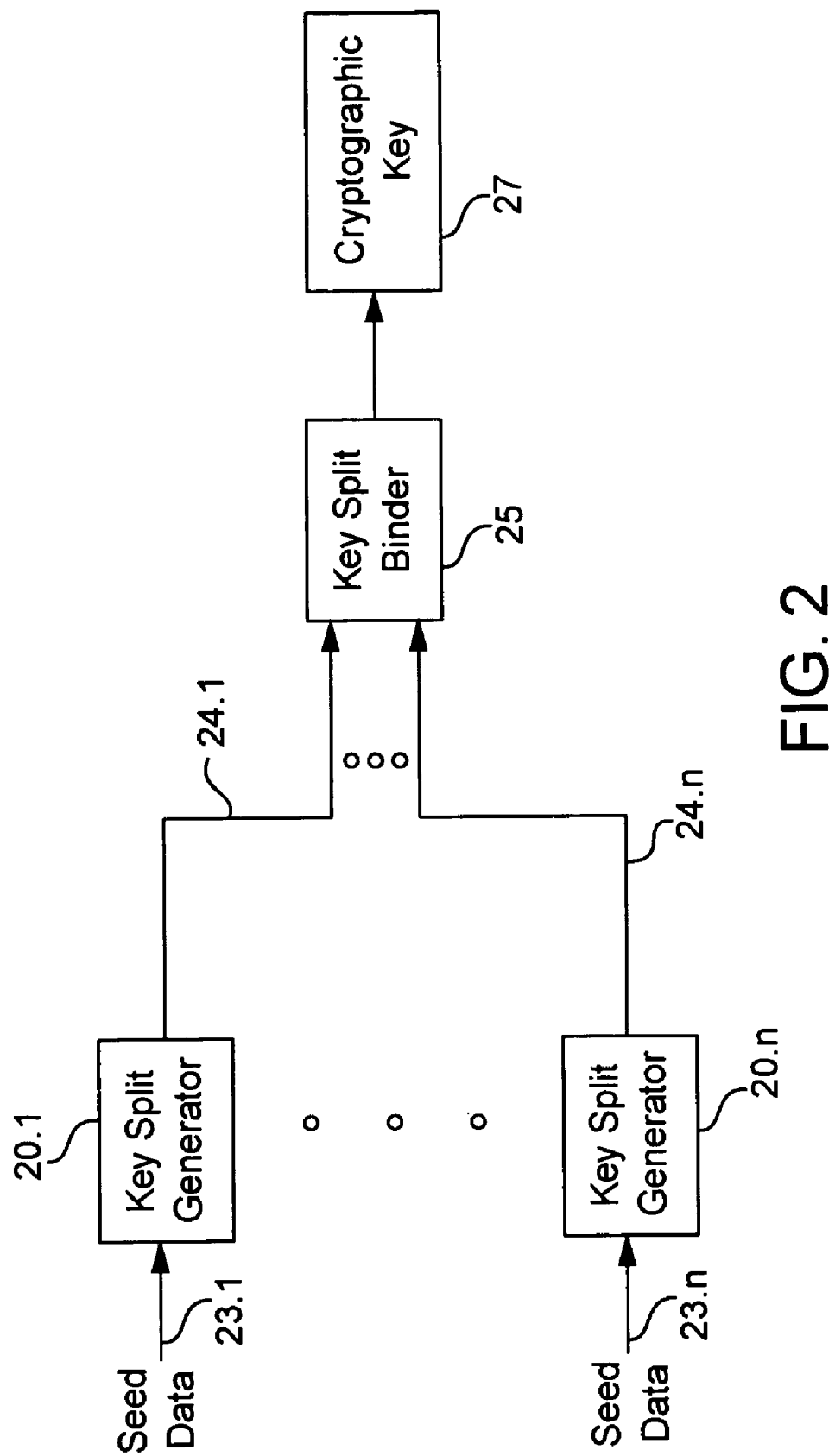
FIG. 2 is a block diagram of a key split combiner.

The keys that are provided at the origination space and at the destination space can be composed of several components, or key splits, each of which can be provided by a different source. As shown in FIG. 2, a number of key split generators 20.1-20.*n* are provided. Each key split generator 20.1-20.*n* receives respective seed data 23.1-23.*n*, and processes the seed data 23.1-23.*n* to generate a respective key split 24.1-24.*n*. The seed data provided to each key split generator can be independent of the seed data provided to the other key split generators, and can be provided independently. Alternatively, the seed data provided to different key split generators can be partially or completely identical, and can be provided by a common source. Each key split generator can accept seed data from a single source, or from multiple sources, and can receive multiple inputs either sequentially or simultaneously.

The key splits are provided to a key split binder 25, which binds the key splits 24.1-24.*n* to form a cryptographic key 27. The binding function performed on the key splits 24.1-24.*n* by the key split binder 25 can be, for example, a randomization function. The particular seed data used, the source of the seed data, the split generation function performed, the number of key splits used, and other parameters characterize the key and the cryptographic function.

Figure 5:
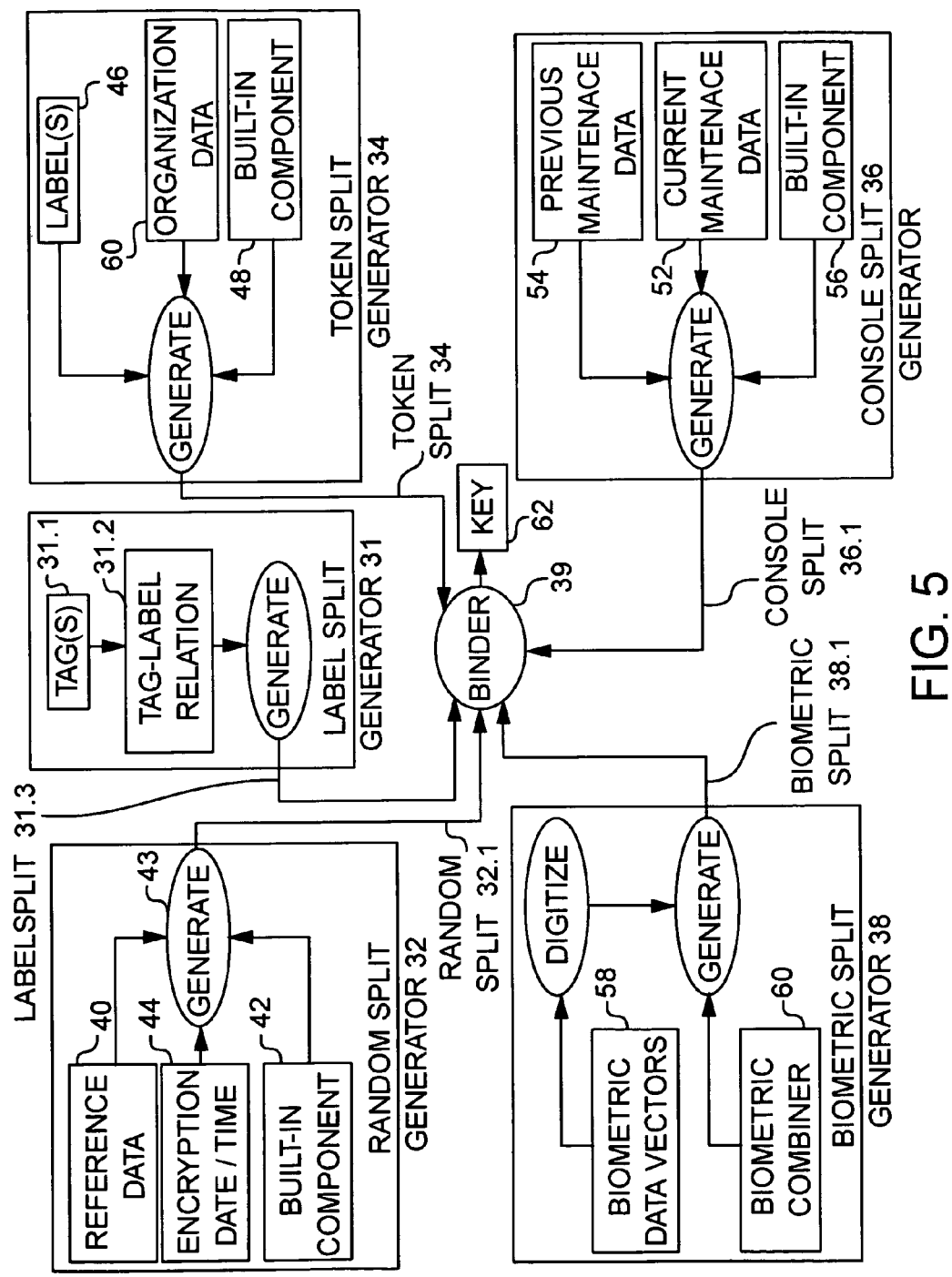
FIG. 5 is a block diagram of an exemplary cryptographic key split binder of the present invention.

For example, as shown in FIG. 5, an exemplary embodiment of the key generator of the present invention can include five key split generators 31, 32, 34, 36, 38, which generate five key splits 31.3, 32.1, 34.1, 36.1, 38.1 to a key split binder 39. The binder 39 performs a binding function on the key splits to produce a cryptographic key 62.

As shown in this exemplary embodiment, a label key split 31.3 can be generated by a label split generator 31, based on data element tags 31.1 and a tag/label relation 31.2. The tag/label relation 31.2 provides correspondence between the tag(s) 31.1 and the labels that provide the basis for the split that will define, for example, the role(s) of the intended recipient of a message encrypted by the key 62, who is authorized to access the message. A random split 32.1 can be randomly or pseudorandomly generated by a random split generator 32. A token split 34.1 can be generated on a token 34, such as a smart card, based on data stored on the token 34. A console split 36.1 can be generated in a console 36, based on data stored on the console 36, and a biometric split 38.1 can be provided by a biometric split generator 38. The key splits are be bound together via the key split binder 39 to form the cryptographic key 62. This key 62 can take the form of a stream of symbols, a group of symbol blocks, an N-dimensional key matrix, or any other form usable by the particular cryptographic scheme, and is independent of the cryptosystem, which can be symmetric or asymmetric.

The label split 31.3 provides a label-based component to the cryptographic key 62. This split 31.3 is generated based on seed data, which can include one or more respective tags 31.1 associated with one or more respective data elements.

Thus, for one or more respectively tagged data elements to be secured, at least one respective tag 31.1 can be related to one or more labels via a tag/label relation 31.2. A tag/label relation 31.2 relates a tag 31.1, either directly or through a conversion or relationship process, to a label. It should be noted that a tag 31.1 can be used directly as seed data, in which case a tag/label relation merely provides a tag 31.1 as seed data. For example, a tag/label relation can include a look-up table or a conversion function (for example, a hash function). Thus, relating tags to labels provides an ability to apply within a particular cryptosystem specific roles, rules, and/or privileges regarding the manipulation of respective data elements. Accordingly, within such a system, an individual's (or computer's) ability to manipulate a tagged data element can depend on that person's (or computer's) role within the system (for example, administrator, management personnel, marketing personnel, software engineer, security level), or on a particular rule or set of rules regarding the tagged data element (for example, only machines within the corporate network domain that provide the requisite token and password can encrypt, decrypt, and view a customer's home phone number).

Reference is now made to FIG. 3, which provides an exemplary data instance having at least one respectively tagged data element. As shown in FIG. 3, an XML data instance can include a company's customer list, in which each customer's name, e-mail address, and home telephone number are stored. As shown in FIG. 4, a tag/label relation 31.2 can be a look-up table in which tags are related to labels (for example, security levels). Thus, if a customer's home phone number is to be secured, its respective tag <HOMEPHONE> can be used to relate to a corresponding label (for example, 2), which can then be provided as seed data for a label split generator 31. It should be noted that a data instance can have plural tags, in which case one or more of the plural tags can be utilized in any defined manner desired. For example, as shown in FIG. 3, the data element representing customers' home phone numbers has as tags, HOMEPHONE, CUSTOMER, and CUSTOMERLIST, and in one particular context, the label HOMEPHONE can be related to a label, while in another context, CUSTOMER can be related to a label.

Referring again to FIG. 2, the random split 32.1 provides a random component to the cryptographic key, which can be desirable to ensure that a different cryptographic key is generated each time, for example, for each session. This split 32.1 is randomly or pseudorandomly generated based on a seed, which is provided by any source, for example, as reference data 40. For example, when a user attempts to log on to a system, the date and time of the user's log-on attempt, represented in digital form, can be used as a seed to generate the random key split 32.1. That is, the seed can be provided to a pseudorandom sequence generator 43 or other randomizer to produce the random split 32.1. Such pseudorandom sequence generators are well known in the art. For example, a simple hardware implementation could include a shift register, with various outputs of the register XORed and the result fed back to the input of the register. Alternatively, the seed can be combined, or randomized, with a built-in component 42, such as a fixed key seed stored at the origination space. The randomization can be performed, for example, by applying a variation of the text/key relation to the generated seed and the stored fixed key seed. This result can be further randomized with, for example, a digital representation of the date and time of the encryption 44, in order to produce the random key split 32.1.

The token split 34.1 can be generated in a similar fashion. In this case, the seed is provided on a token, that is, it is stored on a medium that is possessed by the user. For example, the seed can be stored on a floppy disk, or a smart card, that the system must read as part of the encryption procedure. The token can store a number of different seeds, label data 46 and/or a tag/label relation 31.2, with each seed and/or label corresponding to a different authorization provided by the system or specified by the user. For example, one seed can be used to generate a key split to authorize a particular user to read a message at a particular destination space or a data element having a particular corresponding label. A label can be a key split that authorizes any member of a group of users to read a message at any destination space, and for one particular user to read the message and write over the message at a particular destination space. The label data 46 can even designate a window of time during which access to the communication is valid. Such a seed can be randomized with a built-in component 48, such as a seed stored at the origination space, which can then be further randomized with organization data 50 provided to the organization to which the user belongs.

It is important to note that, although both a label split generator 31 and a token split generator 34 are shown in this example, the key 62 can be generated using only one of the provided splits 31.3, 34.1, even if label data is required by the system. Each one of these split generators 31, 34, provides a key split based on label data, so either can suffice to impart the label restriction to the key. It is contemplated that a system would require both splits 31.3, 34.1, so that the label requirement is based on both something derived from the data element to be encrypted and on something possessed by the user(s). It is also contemplated that each split 31.3, 34.1 would provide label data for a different purpose. That is, the label split 31.3 contribution to the key 62 can be used as a decryption requirement imposed on the recipient's key to enable access to the data element. On the other hand, the label portion of the token split 34.1 contribution to the key 62 can be used by the recipient as an authentication indicator. Thus, the recipient, under these circumstances, can access the encrypted data element using the recipient key, because (in part) the recipient's key includes label split data corresponding to the encrypt key 62 label split 31.3. The recipient is also provided with some level of assurance that the data element was provided by the identified user, through recognition by the recipient of the token split 34.1.

The console split 36.1 is provided by the console split generator 36, derived from a changing value stored at a user space, such as on a system console. Maintenance data, such as the checksum taken from a defragmentation table set, can be used to produce such changing values. For example, the current maintenance data 52 can be randomized with particular previous maintenance data. Alternatively, all previous maintenance data 54 can be randomized with a built-in component 56 stored at the origination space, the results of which are XORed together and randomized with the current maintenance data 52. The randomization result of the changing value is the console split 36.1.

The biometric split 38.1 is generated by a biometric split generator from biometric data vectors 58 provided by biometric samples of the user. For example, a retinal scanner can be used to obtain a unique retinal signature from the user. This information, in digital form, will then be used to generate the biometric split 38.1. This can be accomplished by, for example, randomizing a digital string corresponding to the biometric vectors 58 with biometric combiner data 60, which can be a digital hash of the user's system identification number or some other identifying data that can be linked to the user's physical data provided by the biometric reader. The resulting randomized data is the biometric split 38.1. The biometric split 38.1 provides information that is incapable of being reproduced by anyone but the user providing the biometric data vector 58. Like the token split, 34.1, the biometric split 38.1 can be used by the recipient for authentication of the identity of the user providing the encrypted data element.

The built-in key split components 42, 48, 56 described herein can be static in that they do not change based on uncontrolled parameters within the system. They can be updated for control purposes, however. For example, the built-in key split components 42, 48, 56 can be changed to modify the participation status of a particular user. The key split component can be changed completely to deny access to the user. Alternatively, only a single prime number divisor of the original key split component can be taken from the key split component as a modification, in order to preserve a legacy file. That is, the user will be able to access versions of the file created prior to the modification, but will not be allowed to change the file, effectively giving the user read-only access. Likewise, modification of the key split component can be effected to grant the user broader access.

Once key splits have been generated, they can be bound together to produce the cryptographic key 62 for the securing of a communication (for example, data elements). The key splits can be bound together in any consistently repeatable manner, such that the same or an expected corresponding cryptographic key 62 is produced given the same or corresponding key splits, or at least those key splits necessary for decryption. Where multiple combinings are utilized to generate the complete cryptographic key, a different variation of the text/key relation can be applied. The use of a plurality of different text/key relation variations adds to the security of the overall cryptographic scheme. It is contemplated that key splits other than those specifically described herein can be combined in forming the complete key 62, and that all the key splits described in conjunction with this particular exemplary embodiment might not be necessary. The total number of splits can also vary, and these splits can be used to build a key matrix to add to the complexity of the system. This complete key 62 should be in a form suitable for use in the particular cryptographic scheme. Thus, precoding can be applied when appropriate (for example, padding).

At the destination space, the process is reversed in order to determine whether an individual or computer attempting to access a secured data element(s) is authorized, that is, possesses the valid cryptographic key. Thus, the user or computer at the destination space must possess the data required to create the valid cryptographic key, as discussed further below.

Thus, according to an exemplary aspect of the present invention, a cryptographic key split combiner creates a cryptographic key to secure one or more respectively tagged data elements, and includes a plurality of key split generators for generating cryptographic key splits based on seed data, and a key split binder for binding the cryptographic key splits together to produce the cryptographic key. At least one of the cryptographic key splits is based on at least one of the one or more respective tags. The plurality of key split generators can include any type of key split generator.

In an exemplary embodiment, at least one of the cryptographic key splits is based on at least one of the one or more respective tags of the one or more data elements to be secured. Thus, one or more tags, or a value(s) referenced or generated therewith, can be used as seed data for any type of key split generator, in whole or in part, and individually or in combination with other seed data. Further, a tag, or a value referenced or generated therewith, can be bound (as defined herein) to a generated key split.

The key splits are bound together in any consistently repeatable manner (for example, randomly, via concatenation, via hashing). The resulting cryptographic key can be symmetrically or asymmetrically based, and used to cryptographically secure the one or more data elements. Thus, decryption (access) would require recreating the cryptographic key, or a key corresponding to the cryptographic key, which would require possession of the appropriate data.

According to another exemplary aspect of the invention, a process of cryptographically securing one or more respectively tagged data elements includes generating a plurality of cryptographic key splits from seed data, binding the cryptographic key splits together to produce a cryptographic key, and encrypting the one or more respectively tagged data elements with the cryptographic key. At least one of the cryptographic key splits is based on at least one of the one or more respective tags (as defined herein). Thus, encrypting the one or more data elements secures the data elements from those without the appropriate means to recreate the cryptographic key, or a corresponding key.

In one embodiment of the present invention, an individual or computer already possesses the data needed to recreate a respective cryptographic key, and thus can readily access the one or more secured data elements. However, in another embodiment of the present invention, an individual or computer lacks at least a portion of the requisite data ("keying data"). For example, an individual or computer can lack a random key split (or random value seed), the one or more respective tags used as seed data, identification of particular keys or algorithms needed to bind key splits or decrypt encrypted keying data, or other keying data.

Thus, in yet a further exemplary aspect of the invention, the present invention includes a process of transporting, or otherwise providing, keying data corresponding to a cryptographic key used to decipher one or more respectively tagged, cryptographically secured, data elements. Such a process includes selecting at least a portion of the keying data, and providing the keying data to an intended recipient. Keying data includes any data used or needed to create the cryptographic key by a recipient, and can include, for example, one or more key splits, one or more instances of seed data, one or more key or key/text relation identifiers, and any other type of data used or needed to create the cryptographic key.

A process of transporting or otherwise providing keying data can further include encrypting the keying data before providing the keying data.

A process of transporting keying data can further include formatting the keying data according to a cryptographic message syntax. An exemplary cryptographic message syntax appears at the end of this section.

The following is one example of how a cryptographic message syntax can be used with a cryptographic system utilizing the key binder described herein. Data structures referred to herein are defined below. As mentioned earlier, according to one aspect of the present invention, a unique, one-time encryption key is created from several pieces of data. This key can be referred to as the working key. To recover this key for decryption, those same pieces of data will be brought back together to reconstruct the key. The function used to construct and reconstruct keys will be called the binder. Each piece of data that is input to the binder can be used for a different purpose, for example, to ensure forward or backward secrecy, for access control, etc.

For RecipientInfo, the ExtendedKeyMgmtRecipientinfo field is used, and the ckmRecipientinfo instance is used for ExtendedKeyMgmtRecipientinfo. KeyConstructRecipientinfo has been provided to convey the information necessary to reconstruct the encryption key.

Within KeyConstructRecipientInfo, keyConstructionAlgorithm holds the method used to combine the pieces of data, i.e. it represents the combiner function. In this example, keyAgreeHashConstruction is used.

In KeyConstructDomain, the domainName can be the name of the cryptographic domain. Alternatively, if the name needs to remain hidden, an index, GUID, or other value (for example, a value from which a domain value may be generated) can be used to represent the domain. Keying data is associated with the domain and is called the domain value. This value is one piece of data (for example, static data) that is used to construct a key used for encryption. This will assure that only those entities that have knowledge of the value will be able to perform the decryption, i.e. only those participating in the domain.

Since the domain value is keying material, we want to be able to update this. The level of update that is used in the encryption is represented by domainMaintenanceLevel in KeyConstructDomain. For example, if backward secrecy is desired a one-way function can be used to derive domain values. In this case, the maintenance level would represent the number of times that the one-way function is performed on the initial value. Those entities possessing the value for say, level ten, would be able to recover the key for objects encrypted using a maintenance level equal to or greater than ten but not for objects that have been encrypted with maintenance levels less than ten. Forward secrecy can be provided using a method similar to this. In this example, the domain value will consist of a constant component and a separate maintenance component which will be used for both forward and backward secrecy.

In this particular example, a one-time random value is a necessary input to the binder to produce a cryptographic key. Also in this particular example, the combiner uses symmetric key cryptography with the random value as the key. The constant component of the domain value is the initialization vector. The maintenance component of the domain value is the plaintext. To prevent the maintenance component from being revealed should the working key and random value become known, the combiner is made a one-way function by performing an exclusive-or of each maintenance component block with the corresponding ciphertext block. For example, if three-key triple DES is used for the combiner function, then the random value will be generated as a 112 bit triple DES key. 64 bits of the constant component of the domain value is used as the IV and the maintenance component is used for plaintext. The size of the maintenance component should match the size needed for keying material for the algorithm chosen for object encryption.

In summary, a combiner or binding function described here can be represented by the equation $$WK = e(M, R, D) \text{ XOR } M,$$

where WK is the working key, M is the maintenance component of the domain value, R is the random value, D is the constant component of the domain value, e(x, y, z) is three-key triple DES-CBC encryption of x using key y and IV of z, and XOR is the exclusive—or operation.

The random value resides in the encrypted Key field of KeyConstructRecipientInfo. The KeyConstructRecipient field represents the key or keys that are used to encrypt the random value. Access control is provided through encryption of the random value. To separately control encrypt and decrypt access, asymmetric key cryptography is used. In keeping with the "several pieces of data to construct a key" concept of CKM, one or more public keys can be used to derive the random value encryption key. This means that KeyConstructRecipient holds a list of indices, or other such values that represent the keys that have been chosen for encryption. The public parts of these keys are used to encrypt the random value. The corresponding private keys will be needed for decryption. Possession of the different static public and private key parts constitutes the basis for encrypt and decrypt access control.

To be specific, Diffie-Hellman key agreement (See ANSI X9.42-2000. This method corresponds to section 8.1.6, dhHybridOneFlow, with the public keys corresponding to $Y_v$, the private keys to $X_v$, and $Y_u = t_u \mod p_s$.) with two-key triple DES-ECB is used for random value encryption. An ephemeral key is generated. The public part of the ephemeral key resides in UserKeyingMaterial. Shared keys are derived from the private part of the ephemeral key and each static public key. These shared keys are concatenated and hashed (See ANSI X9.42-2000, Section 7.7. For this example, keylen=112.) to derive the key used to encrypt the random value with triple DES-ECB. The object identifier for this use of Diffie-Hellman is id-ckm-key-agree-hash.

The encrypted random component must be decrypted to recover the working key from the combiner. The public part of the ephemeral key is used with the static private keys to derive the shared keys from which the random encryption key is recovered. The random value is then decrypted and fed to the combiner along with the domain values to reconstruct the working key.

Thus, the key binder provides data separation using cryptography. Key components representing various categories of access are combined into a working key which can be used to encrypt or decrypt data. Typically, a number of pre-placed components are used; these are combined with a random component to ensure that a different working key is used for each message. The random component can be distributed using existing key management mechanisms. The binder is particularly useful where the data flows among groups of users are well-known and predefined.

The binder can be used with either symmetric cryptography or asymmetric cryptography. In the symmetric case, key components can be combined directly, using (for example) a hash function. In the asymmetric case, a party can have either the public key or the private key (or both) for a category, making it simple to implement read/write controls. In this case, it is simpler to use multiple encryption (under each key component) rather than direct combination of the components.

In the following exemplary scenario, each recipient information structure contains the following information: a) an optional domain identifier; b) a recipient (described further below); c) optional user keying material; d) the key construction algorithm identifier; and e) the encrypted content encryption key.

The originator can also include his/her key management certificate, as well as user keying material specific to the key management algorithm.

The recipient in this exemplary environment represents a group of users who share the same categories (key components). Since each component is referenced by a label of the corresponding category, the recipient identifier is just the concatenation of the labels. This can be embedded in the OCTET STRING which identifies a key encryption key (the kekid case):

CKMRecipient::=SEQUENCE OF CKMLabel
   CKMLabel::=OCTET STRING

To prevent traffic analysis, it might be desirable to hide this information from passive adversaries. This can be done by encrypting the underlying transport channel (for example, using SSL). Alternatively, the recipient identifier can be encrypted under a shared symmetric key. This approach has scalability problems, of course, but is suitable for use in closed systems. This leads to the following syntax for a recipient:

```
CKMRecipient ::= CHOICE {
    unencrypted  [0]  SEQUENCE OF CKMLabel,
    encrypted    [1]  EncryptedRecipientID }
EncryptedRecipientID ::= SEQUENCE {
    algorithm         ContentEncryptionAlgorithmIdentifier OPTIONAL,
    keyID        [0]  OCTET STRING OPTIONAL,
    ciphertext        OCTET STRING }
```

Key combining mechanisms can be used to generate the key encryption key for symmetric components, asymmetric key transport, and key agreement. The keyConstructionAlgorithm field identifies the key management mechanisms, as well as the algorithm used to encrypt the content encryption key with the binder-generated key. This is structured as an algorithm identifier, with a parameter field consisting of two object identifiers (or algorithm identifiers), for key management and key wrapping, respectively. Algorithm identifiers are specified below.

In this case, the symmetric components are already available at both ends (except for the random component). The random component is conveyed in the ukm field of the KeyConstructRecipientInfo structure. While it is not necessary for the random component to be kept secret, the mechanisms described herein can be used to hide it from passive adversaries. The random component and the components corresponding to the labels in the recipient ID are combined to form a working key. This, in turn, is used to encrypt the content encryption key. An appropriate combining function would be a cryptographic hash function such as SHA-1.

The construction algorithm in this case is symmetricConstruction, which carries, as parameters, the algorithm identifiers for the combiner function and the (symmetric) key encryption algorithm.

In this case, the sender must have the relevant public keys for the labeled key components of the recipients, while the recipients must have the corresponding private keys. Read and write (i.e. decrypt and encrypt) access controls are cryptographically enforced using this method. The random component is the content encryption key, which is encrypted before being conveyed to the recipient.

The encryption process varies depending on the asymmetric encryption algorithm.

For RSA, as defined in X9.44, encryption proceeds as follows: 1) Sort the labeled public keys in increasing order of modulus; 2) Pad and encrypt the random component and content encryption key under the first public key, as specified in X9.44; 3) For each remaining public key, encrypt the result of the preceding encryption using this public key. No padding or other structuring of the input is performed; the output of the preceding encryption is used as is.

The recipient will unwrap the encrypted random component by using the private decryption keys in the opposite order of encryption.

For the one-pass key transport scheme defined in X9.63, the key transport algorithm is applied once for each labeled public key. Note that a new ephemeral public key is generated for each encryption, and that the input block increases in size for each encryption (since the new ephemeral key is included in the block).

The key agreement mechanism in the following section can be used if this is not acceptable; it uses a single ephemeral key pair and a fixed-size input block.

When Diffie-Hellman is used, an additional ephemeral (one-time) Diffie-Hellman key pair is created. The private key of the ephemeral key pair is used with the Diffie-Hellman public key of each labeled key component, to generate a set of symmetric keys (one per labeled component). These are used to successively encrypt the content encryption key, which is used as the random component. The ephemeral public key is sent as user keying material (UKM). The sender must have the relevant public keys for the labeled key components, while the recipients must have the corresponding private keys. Read and write access controls are cryptographically protected using this method.

The multiple encryption process proceeds as follows: 1. Sort the labeled public keys (in order of label); 2. Use the private part of the ephemeral key pair in combination with the public part of the first labeled key component to generate the first derived symmetric key; 3. Pad the random component as specified in RFC 2630. Encrypt the result under the first derived symmetric key; 4. For each remaining label, use the ephemeral private key with the labeled public key to derive a symmetric key. Encrypt the result of the previous encryption using this symmetric key. No padding or other restructuring of the input is performed.

The process is repeated at the recipient end using the ephemeral public key in combination with the labeled component private keys to recover the derived keys for each label. Then the random component is recovered, using the derived symmetric keys in opposite order of encryption.

The ephemeral key in this case ensures that different symmetric keys are generated to wrap the random component value.

Alternatively, the derived symmetric "keys" can be concatenated then cryptographically hashed. The hash value is then used as the (symmetric) key encryption key.

The recovered (plaintext) random component is typically used as the content encryption key. This allows recipients to be mixed with other types of recipients in the same message.

According to the present invention, symmetric and asymmetric methods can be used together. Asymmetric key components are used to encrypt the random component providing read and write access control. Symmetric key components are combined with the plaintext random components to construct the actual content encryption key.

The construction algorithm for asymmetric key transport is keyTransportConstruction, which carries, as a parameter, the asymmetric encryption algorithm identifier (used to encrypt the content encryption key).

There are two construction algorithms for the key agreement case. When the content encryption key is encrypted under multiple symmetric keys (one per label), the algorithm is keyAgreeMultipleEncryptionConstruction, which carries as parameters the key agreement algorithm identifier (for example, dhhybrid1 for ANSI X9.42), and the (symmetric) key encryption algorithm identifier (used to encrypt the content encryption key under the agreed keys). When the key components are simply hashed to form a single key encryption key, the keyAgreeHashConstruction algorithm is used. Its parameters include the key agreement algorithm, the key encryption algorithm used to encrypt the content encryption key, and the hash algorithm used to form the key encryption key from the agreed keys.

Thus, in yet a further exemplary aspect of the invention, the present invention includes a process of transporting keying data corresponding to a cryptographic key used to decipher one or more respectively tagged, cryptographically secured, data elements. Such a process includes: selecting at least a portion of the keying data; and sending the keying data to an intended recipient. Keying data includes any data needed to create the cryptographic key by a recipient; and may include, for example, one or more key splits, one or more instances of seed data, one or more key or algorithm identifiers and/or any other type of data needed to create the cryptographic key. It should be noted that a key split or a label may be related to a particular key and/or algorithm identifier, and may thus serve more than one informational purpose.

Note that CMS supports the use of multiple key management mechanisms in a single message, where different recipients support different mechanisms. The mechanisms described herein are used to encrypt the random value that is, in turn, used with other values to derive the working (message encryption) key. The other mechanisms described herein encrypt the actual working key itself.

The invention has been described using exemplary and preferred embodiments. However, the scope of the present invention is not limited to these particular disclosed embodiments. To the contrary, the present invention is contemplated to encompass various modifications and similar arrangements. The scope of the claims, therefore, should be accorded the broadest interpretation so as to include all such modifications and similar arrangements. Further, insofar as any term herein is defined more than once and in differing scope, the broadest scope is to be applied as long as functionally compatible with the present invention as claimed.

Exemplary Cryptographic Message Syntax

```
X973CryptographicMessageSyntax
{ iso(1) member-body(2) us(840) x973(10060) module(0) 1}DEFINITIONS IMPLICIT
TAGS ::=
BEGIN
-- EXPORTS All --
-- The types and values defined in this module are exported for use in
-- the other ASN.1 modules. Other applications may use them for their
-- own purposes.
IMPORTS
-- Directory Information Framework (X.501 )
    Name, ATTRIBUTE
        FROM InformationFramework { joint-iso-itu-t ds(5) modules(1)
        informationFramework(1) 3 }
```

-continued

| Exemplary Cryptographic Message Syntax |
|---|

```
-- Directory Authentication Framework (X.509)
    AttributeCertificate, Certificate,
    CertificateList, CertificateSerialNumber, Time
        FROM AuthenticationFramework { joint-iso-itu-t ds(5)
        module(1) authenticationFramework(7) 3 }
-- CertificateExtensions (X.509)
    PolicyInformation FROM CertificateExtensions { joint-iso-itu-t ds(5)
    module(1) certificateExtensions(26) 0 }
-- Biometric syntax
    BiometricSyntax FROM
        X9-84-Biometrics { iso(1) identified-organization(3) tc68(133)
        country(16)
        x9(840) x9Standards(9) x9-84(84) module(0) biometrics(1) }
-- Domain certificate
    DomainCertificate FROM
        DomainCertificate { iso(1) identified-organization(3) tc68(133)
        country(16)
        x9(840) x9Standards(9) x9-68(68) modules(0) domainCertificate(1) }
-- CMS Object Identifiers
    id-signedData, id-envelopedData, id-data, id-digestedData,
    id-ct-authData, id-encryptedData, id-ckm-recip-info, id-x968-cert-type,
    id-ckm-symmetric, id-ckm-key-transport, id-ckm-key-agree-multiple-encrypt,
    id-ckm-key-agree-hash, id-contentType, id-messageDigest, id-signingTime,
    id-signaturePurpose, id-contentIdentifier, id-msgSequenceNo, id-
signing Certificate,
    id-macValue, id-countersignature, id-biometricSyntax, id-otherSigningCertificate
        FROM CMSObjectIdentifiers { iso member-body{2} us{840}
    x973{10060) module(0) 0};
-- Cryptographic Message Syntax
-- Algorithm identifier information object class
ALGORITHM-ID ::= CLASS {
    &id        OBJECT IDENTIFIER UNIQUE,
    &Type      OPTIONAL
}
    WITH SYNTAX { OID &id [PARMS &Type] }
AlgorithmIdentifier { ALGORITHM-ID:IOSet }::=
    SEQUENCE{
        algorithm ALGORITHM-ID.&id({IOSet}),
        parameters ALGORITHM-ID.&Type
            ({IOSet} {@algorithm}) OPTIONAL }
-- Content and content-type specifications
CONTENTS ::= TYPE-IDENTIFIER
Contents CONTENTS ::= {
    { SignedData IDENTIFIED BY id-signedData } |
    { EnvelopedData IDENTIFIED BY id-envelopedData } |
    { AuthenticatedData IDENTIFIED BY id-ct-authData } |
    { DigestedData IDENTIFIED BY id-digestedData } |
    { EncryptedData IDENTIFIED BY id-encryptedData |
    { Data IDENTIFIED BY id-data },
    ...
}
Data ::= OCTET STRING
ContentInfo ::= SEQUENCE {
    contentType              ContentType,
    content                  [0] EXPLICIT CONTENTS.&Type
                             ({Contents} {@contentType}) OPTIONAL }
ContentType ::= CONTENTS.&id({Contents })
SignedData ::= SEQUENCE {
    version                  Version (v3),
    digestAlgorithms         DigestAlgorithmIdentifiers,
    encapContentInfo         EncapsulatedContentInfo,
    certificates             [0] IMPLICIT CertificateSet OPTIONAL,
    crls                     [1] IMPLICIT CertificateRevocationLists OPTIONAL,
    signerInfos              SignerInfos }
DigestAlgorithmIdentifiers ::= SET OF DigestAlgorithmIdentifier
DigestAlgorithms ALGORITHM-ID ::= { ... }   -- any X9-approved algorithm
SignerInfos ::= SET OF SignerInfo
EncapsulatedContentInfo ::= SEQUENCE {
    eContentType             ContentType,
    eContent                 [0] EXPLICIT OCTET STRING OPTIONAL }
SignerInfo ::= SEQUENCE {
    version                  Version (v1 I v3),
    sid                      SignerIdentifier,
    digestAlgorithm          DigestAlgorithmIdentifier,
    signedAttrs              [0] IMPLICIT SignedAttributes OPTIONAL,
    signatureAlgorithm       SignatureAlgorithmIdentifier,
    signature                SignatureValue,
```

-continued

Exemplary Cryptographic Message Syntax

```
    unsignedAttrs              [1] IMPLICIT UnsignedAttributes OPTIONAL }
SignerIdentifier ::= CHOICE {
    issuerAndSerialNumber      IssuerAndSerialNumber,
    subjectKeyIdentifier       [0] SubjectKeyIdentifier }
DigestAlgorithmIdentifier ::= AlgorithmIdentifier { { DigestAlgorithms } }
SignatureAlgorithmIdentifier ::= AlgorithmIdentifier { { SignatureAlgorithms } }
SignatureAlgorithms ALGORITHM-ID ::= { . . . }  -- any X9-approved algorithm
SignedAttributes ::= SET SIZE(1..MAX) OF Attribute {{Signed}}
Signed ATTRIBUTE ::={
    { WITH SYNTAX ContentType ID id-contentType } |
    { WITH SYNTAX MessageDigest ID id-messageDigest } |
    { WITH SYNTAX OBJECT IDENTIFIER ID id-signaturePurpose } |
    { WITH SYNTAX Time ID id-signingTime } |
    { WITH SYNTAX Signing Certificate ID id-signingCertificate } |
    { WITH SYNTAX OtherSigningCertificate ID id-otherSigningCertificate } |
    { WITH SYNTAX BiometricSyntax ID id-biometricSyntax } |
    { WITH SYNTAX INTEGER ID id-msgSequenceNo } |
    { WITH SYNTAX OCTET STRING ID id-contentIdentifier }, . . . }
MessageDigest ::= OCTET STRING
Signing Certificate : :=SEQUENCE {
    certs                      SEQUENCE OF ESSCertID,
    policies                   SEQUENCE OF PolicyInformation OPTIONAL }
ESSCertID ::= SEQUENCE {
    certHash                   OCTET STRING,
    issuerSerial               IssuerAndSerialNumber OPTIONAL }
Hash ::= CHOICE {
    ietf                       OCTET STRING,  -- SHA-1 hash of entire certificate
    withAlgID                  DigestInfo }
OtherSigningCertificate ::= SEQUENCE {
    certs                      SEQUENCE OF OtherCertIDCertID,
    policies                   SEQUENCE OF PolicyInformation OPTIONAL }
ESSCertID ::= SEQUENCE {
    certHash                   Hash,
    issuerSerial               IssuerAndSerialNumber OPTIONAL }
DigestInfo ::= SEQUENCE {
    hashAlgorithm              DigestAlgorithmIdentifier ,
    digest                     OCTET STRING }
UnsignedAttributes ::= SET SIZE(1..MAX) OF Attribute {{Unsigned}}
Unsigned ATTRIBUTE ::= {
    { WITH SYNTAX SignerInfo ID id-countersignature } }
    { WITH SYNTAX BiometricSyntax ID id-biometricSyntax }, . . . }
Attribute { ATTRIBUTE:IOSet } ::= SEQUENCE {
    type                       ATTRIBUTE.&id({IOSet}),
    values                     SET OF ATTRIBUTE.&Type({IOSet}{@type}) }
SignatureValue ::= OCTET STRING
EnvelopedData ::= SEQUENCE {
    version                    Version (vx9-73),
    -- this version number is not defined in RFC 2630. If RFC 2630 is updated
    -- to add external key management mechanisms, this will be modified to align
    -- with RFC 2630.
    originatorInfo             [0] IMPLICIT OriginatorInfo OPTIONAL,
    recipientInfos             RecipientInfos,
    encryptedContentInfo       EncryptedContentInfo,
    unprotectedAttrs           [1] UnprotectedAttributes OPTIONAL }
UnprotectedAttributes ::= SET OF Attribute { {Unprotected} }
Unprotected ATTRIBUTE ::= { . . . }
OriginatorInfo ::= SEQUENCE {
    certs                      [0] IMPLICIT CertificateSet OPTIONAL,
    crls                       [1] IMPLICIT CertificateRevocationLists OPTIONAL }
RecipientInfos ::= SET OF RecipientInfo
EncryptedContentInfo ::= SEQUENCE {
    contentType                ContentType,
    contentEncryptionAlgorithm ContentEncryptionAlgorithmIdentifier,
    encryptedContent           [0] IMPLICIT EncryptedContent OPTIONAL }
ContentEncryptionAlgorithmIdentifier ::= AlgorithmIdentifier {
{ContentEncryptionAlgorithms} }
ContentEncryptionAlgorithms ALGORITHM-ID ::= { . . . } -- any X9-approved algorithm
EncryptedContent ::= OCTET STRING
RecipientInfo ::= CHOICE {
    ktri                       KeyTransRecipientInfo,
    kari                       [1] KeyAgreeRecipientInfo,
    miri                       [2] KEKRecipientInfo,
    -- Choice [3] reserved for IETF password-based encryption
    ekmri                      [4] ExtendedKeyMgmtRecipientInfo }
EXTENDED-KEY-MGMT-INFO ::= TYPE-IDENTIFIER
ExtendedKeyMgmtRecipientInfo ::=
    INSTANCE OF EXTENDED-KEY-MGMT-INFO ( {EKMIOSet} )
```

-continued

| Exemplary Cryptographic Message Syntax |
| --- |

```
EKMIOSet EXTENDED-KEY-MGMT-INFO ::= { ckmRecipientInfo, . . . }
ckmRecipientInfo EXTENDED-KEY-MGMT-INFO ::=
    { KeyConstructRecipientInfo IDENTIFIED BY id-ckm-recip-info }
KeyConstructRecipientInfo ::= SEQUENCE {
    version                 Version (v5),
    did                     KeyConstructionDomain OPTIONAL,
    ckmid                   [0] KeyConstructionRecipient,
    ukm                     UserKeyingMaterial OPTIONAL,
    keyConstructionAlgorithm    KeyConstructionAlgorithmIdentifier,
    encryptedKey            EncryptedKey }
KeyConstructionDomain ::= SEQUENCE {
    domainName              DomainName,
    domainMaintenanceLevel  DomainMaintenanceLevel }
DomainName : := PrintableString
DomainMaintenanceLevel ::= INTEGER
KeyConstructionRecipient ::= CHOICE {
    unencrypted             [0] SEQUENCE OF KeyConstructionLabel,
    encrypted               [1] EncryptedRecipientID }
KeyConstructionLabel : := OCTET STRING
EncryptedRecipientID ::= SEQUENCE {
    algorithm               ContentEncryptionAlgorithmIdentifier OPTIONAL,
    keyID                   [0] OCTET STRING OPTIONAL,
    ciphertext              OCTET STRING }
EncryptedKey ::= OCTET STRING
KeyTransRecipientInfo ::= SEQUENCE {
    version                 Version (v0 | v2 ),
    rid                     EntityIdentifier,
    keyEncryptionAlgorithm  KeyEncryptionAlgorithmIdentifier,
    encryptedKey            EncryptedKey }
KeyConstructionAlgorithmIdentifier ::= AlgorithmIdentifier {
    {KeyConstructionAlgorithms} }
KeyConstructionAlgorithms ALGORITHM-ID ::=
    { symmetricConstruction | keyTransportConstruction |
    keyAgreeMultipleEncryptionConstruction | keyAgreeHashConstruction }
symmetricConstruction ALGORITHM-ID ::=
    { OID id-ckm-symmetric PARMS ConstructionAlgorithms }
ConstructionAlgorithms ::= SEQUENCE {
    combiner                CombinerAlgorithmIdentifier,
    keyEncryptionAlgorithm  KeyEncryptionAlgorithmIdentifier }
CombinerAlgorithmIdentifier ::= AlgorithmIdentifier { {CombinerAlgorithms} }
CombinerAlgorithms ALGORITHM-ID ::= { . . . }-- any X9-approved algorithm
keyTransportConstruction ALGORITHM-ID ::=
    { OID id-ckm-key-transport PARMS KeyEncryptionAlgorithmIdentifier }
keyAgreeMultipleEncryptionConstruction ALGORITHM-ID ::=
    { OID id-ckm-key-agree-multiple-encrypt PARMS KeyAgree1Algorithms }
KeyAgree1Algorithms ::= SEQUENCE {
    keyAgreementAlgorithm   KeyEncryptionAlgorithmIdentifier,
    keyEncryptionAlgorithm  KeyEncryptionAlgorithmIdentifier }
keyAgreeHashConstruction ALGORITHM-ID ::=
    { OID id-ckm-key-agree-hash PARMS KeyAgree2Algorithms }
KeyAgree2Algorithms ::= SEQUENCE {
    keyAgreementAlgorithm   KeyEncryptionAlgorithmIdentifier,
    keyEncryptionAlgorithm  KeyEncryptionAlgorithmIdentifier,
    hashAlgorithm           DigestAlgorithmIdentifier }
KeyEncryptionAlgorithmIdentifier ::= AlgorithmIdentifier {
    {KeyEncryptionAlgorithms} }
KeyEncryptionAlgorithms ALGORITHM-ID ::= { . . . } -- any X9-approved algorithm
EntityIdentifier ::= CHOICE {
    issuerAndSerialNumber   IssuerAndSerialNumber,
    subjectKeyIdentifier    [0] SubjectKeyIdentifier }
KeyAgreeRecipientInfo ::= SEQUENCE {
    version                 Version (v3),
    originatorCert          [0] EXPLICIT EntityIdentifier,
    ukm                     [1] EXPLICIT UserKeyingMaterial OPTIONAL,
    keyEncryptionAlgorithm  KeyEncryptionAlgorithmIdentitier ,
    recipientEncryptedKeys  RecipientEncryptedKeys }
RecipientEncryptedKeys ::= SEQUENCE OF RecipientEncryptedKey
RecipientEncryptedKey ::= SEQUENCE {
    rid                     RecipientIdentifier ,
    encryptedKey            EncryptedKey }
RecipientIdentifier ::= CHOICE {
    issuerAndSerialNumber   IssuerAndSerialNumber,
    rKeyID                  [0] IMPLICIT RecipientKeyIdentifier }
RecipientKeyIdentifier ::= SEQUENCE {
    subjectKeyIdentifier    SubjectKeyIdentifier ,
    date                    GeneralizedTime OPTIONAL,
    other                   OtherKeyAttribute OPTIONAL }
```

-continued

Exemplary Cryptographic Message Syntax

```
SubjectKeyIdentifier ::= OCTET STRING
KEKRecipientInfo : := SEQUENCE {
    version                 Version (v4),
    kekid                   KEKIdentifier ,
    keyEncryptionAlgorithm  KeyEncryptionAlgorithmIdentifier,
    encryptedKey            EncryptedKey }
KEKIdentifier : :=SEQUENCE {
    kekIdentifier           OCTET STRING,
    date                    GeneralizedTime OPTIONAL,
    other                   OtherKeyAttribute OPTIONAL }
DigestedData ::= SEQUENCE {
    version                 Version (v0),
    digestAlgorithm         DigestAlgorithmIdentifier,
    encapContentInfo        EncapsulatedContentInfo,
    digest                  Digest }
Digest ::= OCTET STRING
EncryptedData ::= SEQUENCE {
    version                 Version (v0),
    encryptedContentInfo    EncryptedContentInfo }
AuthenticatedData ::= SEQUENCE {
    version                 Version (v0),
    originatorInfo          [0] IMPLICIT OriginatorInfo OPTIONAL,
    recipientInfos          RecipientInfos,
    macAlgorithm            MessageAuthenticationCodeAlgorithm,
    encapContentInfo        EncapsulatedContentInfo,
    authenticatedAttributes [1] IMPLICIT AuthAttributes OPTIONAL,
    mac                     MessageAuthenticationCode,
    unauthenticatedAttributes [2] IMPLICIT UnauthAttributes OPTIONAL }
MessageAuthenticationCodeAlgorithm ::= AlgorithmIdentifier { {MACAlgorithms} }
MACAlgorithms ALGORITHM-ID ::= { . . . } -- any X9-approved algorithm
AuthAttributes ::= SET SIZE(1..MAX) OF Attribute {{Authenticated}}
Authenticated ATTRIBUTE ::={
    { WITH SYNTAX ContentType ID id-contentType } |
    { WITH SYNTAX MACValue ID id-macValue } |
    { WITH SYNTAX OBJECT IDENTIFIER ID id-signaturePurpose } |
    { WITH SYNTAX Time ID id-signingTime } |
    { WITH SYNTAX INTEGER ID id-msgSequenceNo } |
    { WITH SYNTAX OCTET STRING ID id-contentIdentifier },
    . . . }
MACValue ::= OCTET STRING
UnauthAttributes ::= SET SIZE(1..MAX) OF Attribute {{ Unauthenticated }}
Unauthenticated ATTRIBUTE ::= { . . . }
MessageAuthenticationCode ::= OCTET STRING
CertificateRevocationLists ::= SET OF CertificateList
CertificateChoices ::= CHOICE {
    certificate             Certificate, -- See X.509
    attrCert                [1] IMPLICIT AttributeCertificate, -- See X.509 & X9.57
    otherCert               [2] IMPLICIT OtherCertificate }
OtherCertificate ::= INSTANCE OF OTHER-CERT
OTHER-CERT ::= TYPE-IDENTIFIER
x968-cert-type OTHER-CERT ::= { DomainCertificate IDENTIFIED BY
    id-x968-cert-type}
CertificateSet : := SET OF CertificateChoices
IssuerAndSerialNumber : := SEQUENCE {
    issuer                  Name,
    serialNumber            CertificateSerialNumber }
Version ::= INTEGER { v0(0), v1(1), v2(2), v3(3), v4(4), v5(5), vx9-73(73) }
UserKeyingMaterial : := OCTET STRING
UserKeyingMaterials ::= SET SIZE(1..MAX) OF UserKeyingMaterial
OtherKeyAttribute: := AttributeTypeAndValue
AttributeTypeAndValue ::= SEQUENCE {
    type                    ATTRIBUTE.&id({OtherAttributes}),
    value                   ATTRIBUTE.&Type({OtherAttributes} {@type}) }
OtherAttributes ATTRIBUTE ::= { . . . }
END    -- X973CryptographicMessageSyntax
x968-cert-type OTHER-CERT ::= { DomainCertificate IDENTIFIED BY id-x968-cert-
type }
CertificateSet : := SET OF CertificateChoices
IssuerAndSerialNumber : := SEQUENCE {
issuer
Name,
serialNumber CertificateSerialNumber }
Version ::= INTEGER { v0(O), v1(1), v2(2), v3(3), v4(4), v5(5), vx9-73(73) }
UserKeyingMaterial : := OCTET STRING
UserKeyingMaterials ::= SET SIZE(1..MAX) OF UserKeyingMaterial
OtherKey Attribute: := AttributeTypeAndValue
AttributeTypeAndValue ::= SEQUENCE {
```

| Exemplary Cryptographic Message Syntax |
|---|
| type<br>A TTRIBUTE.&id({OtherAttributes}),<br>value ATTRIBUTE.&Type({OtherAttributes} {@type}) }<br>OtherAttributes ATTRIBUTE ::= { . . . }<br>END<br>-- X973CryptographicMessageSyntax |

We claim:

1. A process of creating a cryptographic key to secure a tagged data element, comprising:
    selecting a tagged data element, from among a plurality of tagged data elements, based on an associated data tag;
    generating a plurality of cryptographic key splits from seed data; and
    binding the cryptographic key splits together to produce the cryptographic key;
    wherein at least one of the cryptographic key splits is based on the associated data tag.

2. The process of claim 1, wherein the cryptographic key is one of a symmetric key and an asymmetric key.

3. The process of claim 1, wherein the seed data for the at least one cryptographic key split includes the associated data tag.

4. The process of claim 1, wherein the associated data tag is the seed data for the at least one cryptographic key split.

5. The process of claim 1, wherein generating a plurality of cryptographic key splits from seed data includes generating a random split based on reference data.

6. The process of claim 5, wherein generating a plurality of cryptographic key splits from seed data includes generating a label split based on tag data.

7. The process of claim 1, wherein generating a plurality of cryptographic key splits from seed data includes generating a label split based on tag data.

8. The process of claim 1, wherein the associated data tag corresponds to at least one of a role, a rule and a privilege.

9. The process of claim 1, wherein the associated data tag corresponds to at least one label based on one of a role, a rule and a privilege.

10. The process of claim 1, wherein the associated data tag corresponds to an identification function unrelated to access control.

11. A process of cryptographically securing one or more respectively tagged data elements, comprising:
    selecting a tagged data element, from among a plurality of tagged data elements, based on an associated data tag;
    generating a plurality of cryptographic key splits from seed data;
    binding the cryptographic key splits together to produce a cryptographic key; and
    encrypting the selected tagged data elements with the cryptographic key;
    wherein at least one of the cryptographic key splits is based on the associated data tag.

12. The process of claim 11, wherein the cryptographic key is one of a symmetric key and an asymmetric key.

13. The process of claim 11, wherein the seed data for the at least one cryptographic key split includes the associated data tag.

14. The process of claim 11, wherein the associated data tag is the seed data for the at least one cryptographic key split.

15. The process of claim 11, wherein generating a plurality of cryptographic key splits from seed data includes generating a random split based on reference data.

16. The process of claim 15, wherein generating a plurality of cryptographic key splits from seed data includes generating a label split based on tag data.

17. The process of claim 11, wherein generating a plurality of cryptographic key splits from seed data includes generating a label split based on tag data.

18. The process of claim 11, wherein the associated data tag corresponds to at least one of a role, a rule and a privilege.

19. The process of claim 11, wherein the associated data tag corresponds to at least one label based on one of a role, a rule and a privilege.

20. The process of claim 11, wherein the associated data tag corresponds to an identification function unrelated to access control.

* * * * *